Oct. 26, 1926.
E. S. EARLES
1,604,268
AUTOMATIC ANIMAL TRAP
Filed Jan. 9, 1926  2 Sheets-Sheet 1
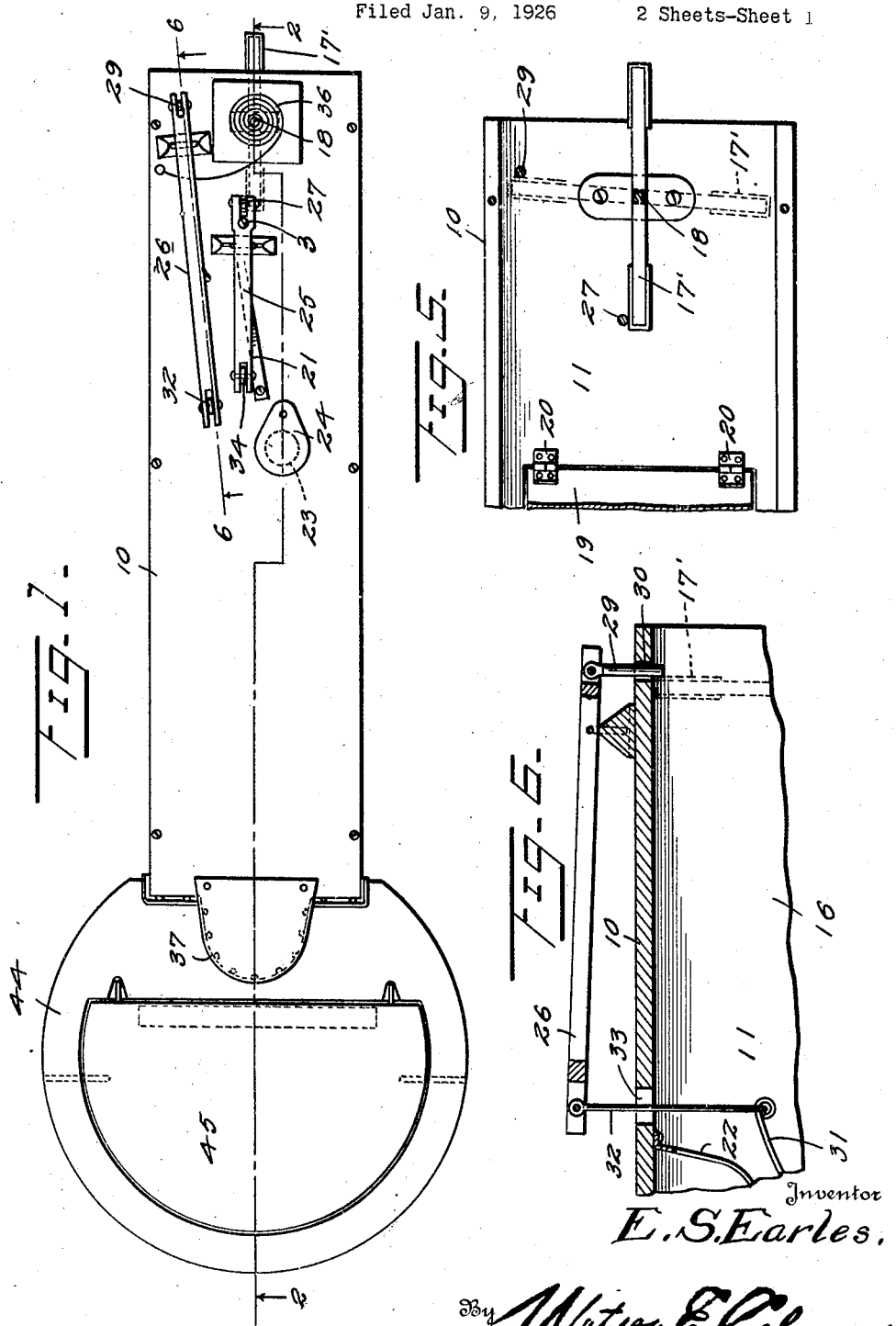
Inventor
E. S. Earles,
By Watson E. Coleman
Attorney

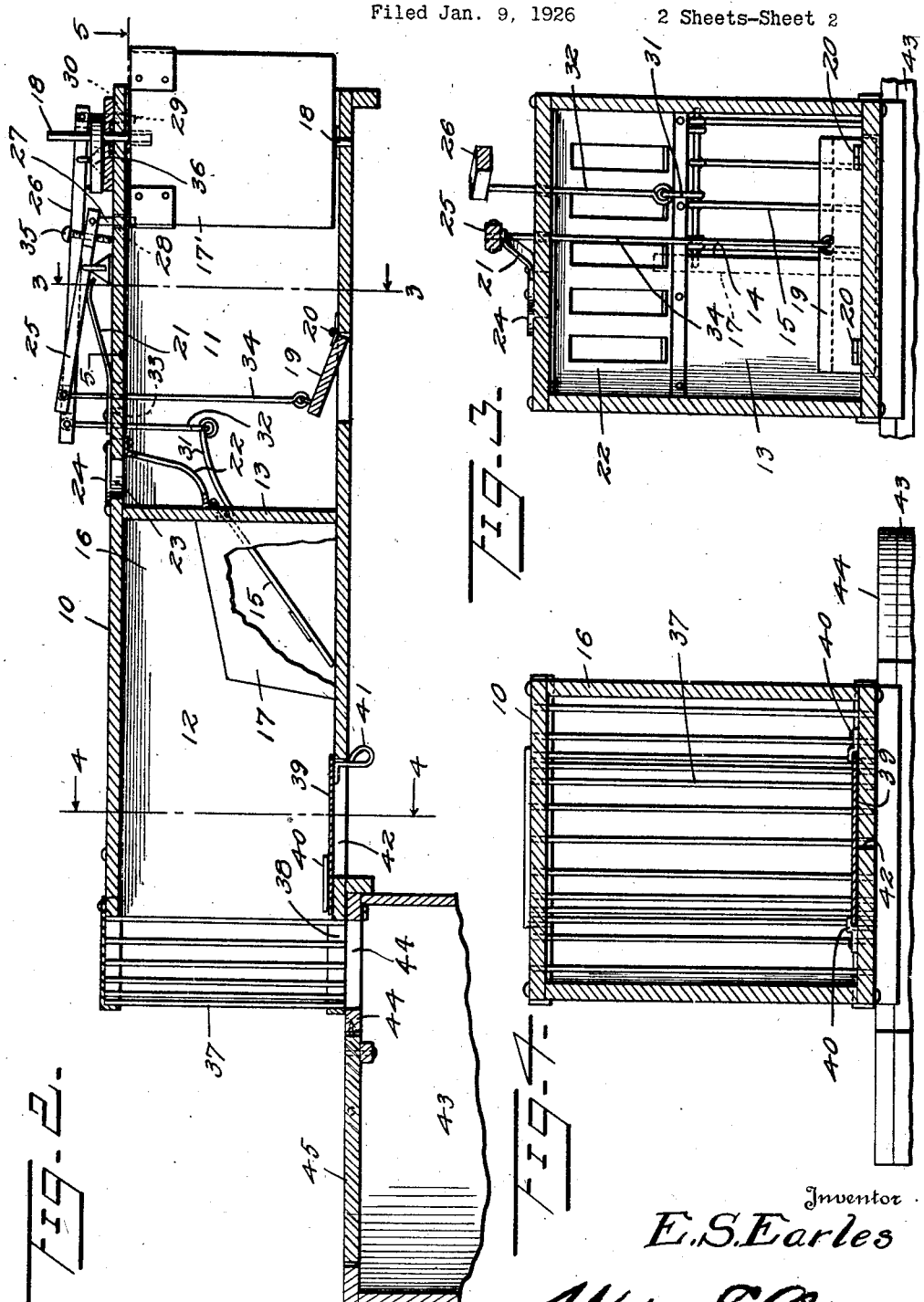

Patented Oct. 26, 1926.

1,604,268

UNITED STATES PATENT OFFICE.

ELISHA S. EARLES, OF CARRSVILLE, KENTUCKY.

AUTOMATIC ANIMAL TRAP.

Application filed January 9, 1926. Serial No. 80,291.

This invention relates to animal traps and more particularly to that type of animal trap which is automatically reset by passage of the animal from one compartment to another of the trap.

An important object of the invention is to produce a trap of this type wherein the resetting operation does not require the exertion of any considerable pressure on the part of the animal so that there is no tendency on the part of the animal to remain in the compartment in which he originally finds himself as the trap is sprung.

A further object of the invention is to provide a device of this character which is very readily set and from which the animals may be very readily removed.

A still further object of the invention is to provide a device of this character which may be employed with or without storage compartments into which the animals may pass.

These and other objects I attain by the construction shown in the accompanying drawings, wherein for the purpose of illustration is shown a preferred embodiment of my invention and wherein:—

Figure 1 is a plan view of a trap constructed in accordance with my invention;

Figure 2 is a section on the line 2—2 of Figure 1;

Figure 3 is a transverse sectional view through the trap on the line 3—3 of Figure 2;

Figure 4 is a section on the line 4—4 of Figure 2;

Figure 5 is an enlarged detail section on the line 5—5 of Figure 2;

Figure 6 is an enlarged detail sectional view on the line 6—6 of Figure 1.

Referring now more particularly to the drawings, the numeral 10 indicates a casing divided in two compartments 11 and 12 by a transversely extending partition 13 which is preferably of some solid material cutting off the view from one compartment to the other with the exception of a single doorway or opening 14 formed at one side of the partition.

Pivoted at the upper end of this doorway is a grating 15 which inclines downwardly into the compartment 12 and combines with one side wall 16 of the casing and with a baffle wall 17 to produce a passageway. This grating may be lifted by the animal to permit its passage from the compartment 11 into the compartment 12 and after its passage falls so that its lower end engages the floor of the compartment 12 between the partition wall 17 and wall 16 so that its return is prevented.

The end of the compartment 12 opposite that defined by the partition 13 has associated therewith a door 17' rotating about a centrally located pivot 18 which is preferably but not necessarily vertically arranged. A portion of the floor of the compartment 11 comprises a movable section 19 pivoted along one edge, as indicated at 20. This platform has associated therewith, as more particularly described hereinafter, a spring 21 normally maintaining the same in elevated position. This platform is located adjacent the partition 13 and the upper portion of this partition, together with a grid 22 and the top of the casing, forms a bait receptacle to which access may be had through an opening 23 formed in the top of the casing and having associated therewith a pivoted cover 24.

Arranged upon the top of the casing is a pair of longitudinally extending levers 25 and 26. The lever 25 has pivoted to its forward end or that end corresponding to the end of the casing at which the door 17 is arranged a stop 27 projecting through and guided by an opening 28 formed in the top of the casing in such manner as to engage the door 17 when the same is disposed longitudinally of the casing. The lever 26 has pivoted to its forward end a similar stop 29 projecting through and guided by an opening 30 in the top of the casing and engaging the door to limit movement thereof in one direction when the door is arranged transversely of and closes the forward end of the compartment 11. The grid 15 has secured thereto an arm 31 which is connected with the rear end of the lever 26 by a link 32 extending through an opening 33 in the top of the casing while the rear end of the lever 25 is connected with the free edge of the platform 19 by a rigid link 34. The spring, hereinbefore referred to, preferably engages the rear end of the lever 25 and is located upon the top of the casing. The front end of the lever has directed therethrough an adjustable threaded stop element 35 which engages the top of the casing when the platform has elevated to a predetermined degree to limit movement of the platform and accordingly the movement of the stop member 27. It will, of course, be realized that this determines the amount of movement of the platform which is necessary to release the door for movement when such movement is opposed by the stop 27. One pivot of the door is preferably extended through the top of the trap and has engaged therewith one end of a clock spring 36 or similar element for rotating the same. It will be obvious that this spring will tend to continuously rotate the door in one direction and that the door will engage one of the stops as, for example, the stop 29, and be limited in its rotation. This engagement with the stop 29 only takes place after an animal has entered the trap and by engaging the platform 19 has released the door from the stop 27. This locks the animal in the compartment 11 and the animal, frightened by the sudden closing of the door, will endeavor to escape therefrom and pass through the passageway, a portion of which is formed by the grid 15. In elevating the grid, it trips the lever 26 with the result that the stop 29 is elevated and the door is permitted to rotate through ninety degrees or until one edge thereof comes into engagement with the stop 27 when the trap is again reset.

The rear end of the compartment 12 is formed by a grating 37, the central portion of which at the bottom of the cage is preferably extended from the rear edge of the bottom wall of the cage to provide an opening 38. This opening, if the trap is to be employed without a storage compartment, will be closed by a slide 39 carried by suitable guides 40 mounted upon the outer surface of the floor and is operable from the exterior of the trap through an arm 41 projecting through a slot 42 formed in the floor. If desired, a storage receptacle 43 may be employed having a cover 44 provided with one of the usual self-restoring pivoted platforms 45 to which access may be had to the receptacle without removing animals. This cover will further have an opening 46 alignable with the opening 38, so that animals may pass from the compartment 12 into the storage receptacle.

It will, of course, be obvious that the construction of the trap is capable of a considerable range of change and modification without materially departing from the spirit of the invention and I accordingly do not limit myself to such specific structure except as hereinafter claimed.

I claim:—

1. In a trap, a casing divided into two compartments, a movable grid permitting passage from one of said compartments to the other but preventing return to the first named compartment, a door for the first named compartment swingable about a central axis from a position where it closes the entrance of the first named compartment to a position where it extends longitudinally of the compartment and permits access thereto, stops for limiting rotation of the door in said positions, means constantly tending to rotate the door, a pivoted platform within the first named compartment, a lever mounted upon the outer wall of the casing and connected at one end with the stop limiting element of the door when arranged longitudinally of the compartment, a connection between the opposite end of the lever and the platform, a spring engaging the lever and tending to maintain the platform in elevated position, and a connection between the grid and the other of the stops for releasing said other stop when the grid is moved to permit passage of the animal from the first to the last named compartments.

2. In a trap, a casing divided into two compartments, a movable grid permitting passage from one of said compartments to the other but preventing return to the first named compartment, a door for the first named compartment swingable about a central axis from a position where it closes the entrance of the first named compartment to a position where it extends longitudinally of the compartment and permits access thereto, stops for limiting rotation of the door in said positions, means constantly tending to rotate the door, a pivoted platform within the first named compartment, a lever mounted upon the outer wall of the casing and connected at one end with the stop limiting element of the door when arranged longitudinally of the compartment, a connection between the opposite end of the lever and the platform, a spring engaging the lever and tending to maintain the platform in elevated position and a connection between the grid and the other of the stops for releasing said other stop when the grid is moved to permit passage of the animal from the first to the last named compartments, the connections between said stops and said grid and platform positively returning the stops to their door-engaging positions when released.

In testimony whereof I hereunto affix my signature.

ELISHA S. EARLES.